United States Patent
Sheiman et al.

[11] Patent Number: 5,181,741
[45] Date of Patent: Jan. 26, 1993

[54] ICE BLOCK SLED

[76] Inventors: Lawrence S. Sheiman; Jonathan C. Sheiman, both of 7310 Marina Pacifica Dr. S., Long Beach, Calif. 90803

[21] Appl. No.: 437,731

[22] Filed: Nov. 16, 1989

Related U.S. Application Data

[63] Continuation of Ser. No. 294,169, Jan. 6, 1989, Pat. No. 5,039,130.

[51] Int. Cl.$^5$ ............................................. B62B 9/04
[52] U.S. Cl. .................................... 280/845; 280/18; 280/28; 280/28.14
[58] Field of Search ................ 280/845, 900, 28.14, 280/23.1, 28, 18.1, 14.2, 841, 18

[56] References Cited

U.S. PATENT DOCUMENTS

| | | | |
|---|---|---|---|
| 126,018 | 4/1872 | Townsend | 280/23.1 |
| 3,606,366 | 9/1971 | Engelberger | 280/841 |
| 3,794,341 | 2/1974 | Torok | 280/18 |
| 4,025,082 | 5/1977 | Lummas | 280/545 |

FOREIGN PATENT DOCUMENTS 2838708  3/1979  Fed. Rep. of Germany ........ 280/28

*Primary Examiner*—Richard M. Camby
*Attorney, Agent, or Firm*—Blakely, Sokoloff, Taylor, Zafman

[57] ABSTRACT

An improved sled for recreational use. The sled comprises a support member which is formed in the shape of a seat to accommodate a rider in an upright position. The support member has handholds at either edge for the rider to grasp. A block of ice is coupled to the bottom side of the support member. The ice is held in place by an adjustable retention member. The retention member is made up of two support blocks which are rigidly attached to the support member. A compression block is adjustably connected to each of the support blocks by means of a locking screw disposed through the support blocks. As the screw is turned, the compression blocks move inwardly clamping the ice. In alternative embodiments of the retention member, the locking screws are replaced by springs which automatically force the support blocks inward and pieces of flexible foam rubber are used to hold the ice block in place.

1 Claim, 3 Drawing Sheets

ICE BLOCK SLED

This is a continuation of application Ser. No. 294,169 now U.S. Pat. No. 5,039,130 filed Jan. 6, 1989.

FIELD OF THE INVENTION

This invention relates to the field of outdoor recreational devices, and more particularly to an all-purpose, all-weather sled.

BACKGROUND OF THE INVENTION

During the winter months, a popular recreational activity for children and adults, is riding a sled down snow-covered hillsides. Naturally, this activity can only be practiced in an area where the climate is cold enough to allow for snowfall. Consequently, many people in areas with a warm climate are unable to enjoy this activity unless they travel to colder climates or mountainous areas.

A common form of sled that is used in the prior art typically consists of a flat surface mounted on top of runners. These runners are typically made of metal and have a sharpened edge which rides along the surface of the snow. The edges are sharpened in order to minimize the amount of friction between the sled and the hillside. Since small children often use sleds, the sharpened runners can pose a threat of injury. This injury can occur simply when a child handles the sled in an improper manner. Even more dangerous situations can arise when a person riding the sled allows the sled to get out of control, and collides with another person on the hillside.

SUMMARY OF THE INVENTION

It has been found that the aforementioned difficulties may be overcome through the use of an improved sled which is described herein. The new aspect of the sled is an undersurface comprising a block of ice. The use of an ice block provides several advantages over the prior art. As the ice melts, it provides a thin, friction-free layer for the sled to travel on. This allows the sled to be used in all types of weather and on all types of surfaces. Thus, the sled will not be limited to use on snow-covered hillsides. For example, it can be used on grassy surfaces in warm weather or on any other inclined area.

The use of the ice block also obviates the need for the sharpened metal runners of prior art sleds. This results in a sled which is safer to use for both the rider and any other person near the area where the sled is in use. It also results in reduced manufacturing costs for the sled since it is no longer necessary to include the runners.

Since the ice block will naturally melt with use, the present invention has the additional advantage of being smaller than prior art sleds. Where prior art sleds consisted of a flat surface or seat and the metal runners, the present invention consists only of the seat when not in use. Thus, less room is needed to store the sled. Also, the transportation of the sled to and from the sledding area is made easier.

DETAILED DESCRIPTION OF THE INVENTION

An improved sled for recreational use is described. In the following description, for purposes of explanation, specific elements such as the ice block clamping means are described in detail in order to provide a thorough understanding of the present invention. In other instances, well known elements and methods of manufacture are not set forth in detail so as not to obscure the present invention unnecessarily.

Figure 1:
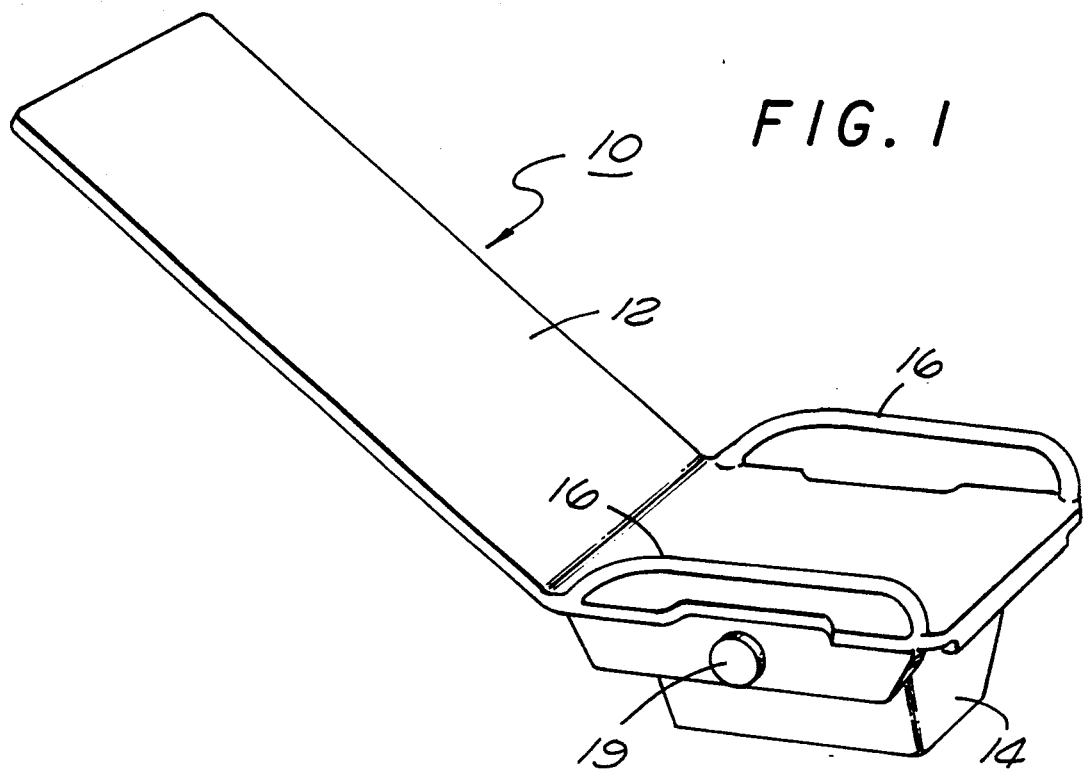
FIG. 1 is a perspective view of the preferred embodiment of the present invention.
Figure 2:
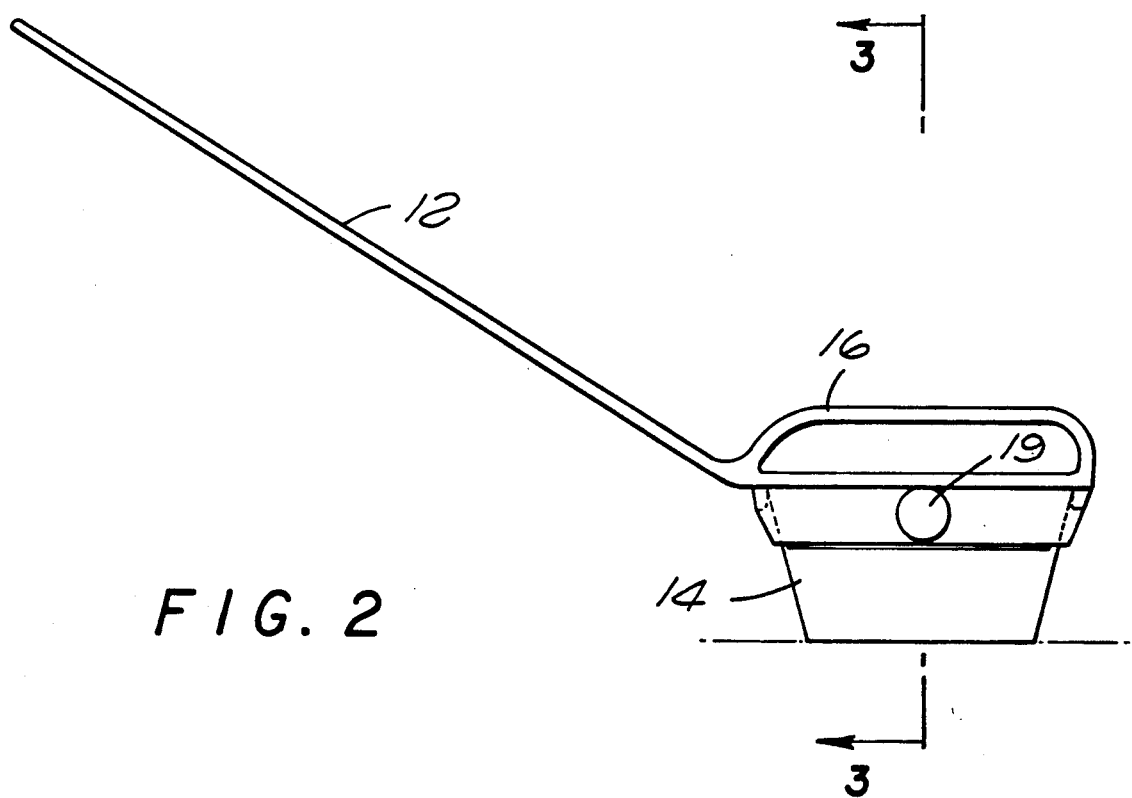
FIG. 2 is a side view of the present invention with the ice block.

Referring first to FIG. 1, it can be seen that the sled 10 of the present invention is made up of a support member 12 having an ice block 14 mounted to it. The support member 12 is a rigidly formed structure which can be made of fiberglass, plastic or some other equivalent material. In the preferred embodiment, the support member 12 is constructed in the shape of a seat so as to allow the rider to sit comfortably. It will be apparent to those skilled in the art, however, that various other designs can be used for the seat without departing from the scope of the present invention. For example, the support member may simply be a flat surface in which the rider lies in a prone position or stands upright. In the preferred embodiment, handholds 16 are provided on both sides of the support member 12 so that the rider may have something to grasp while riding the sled.

Figure 3:
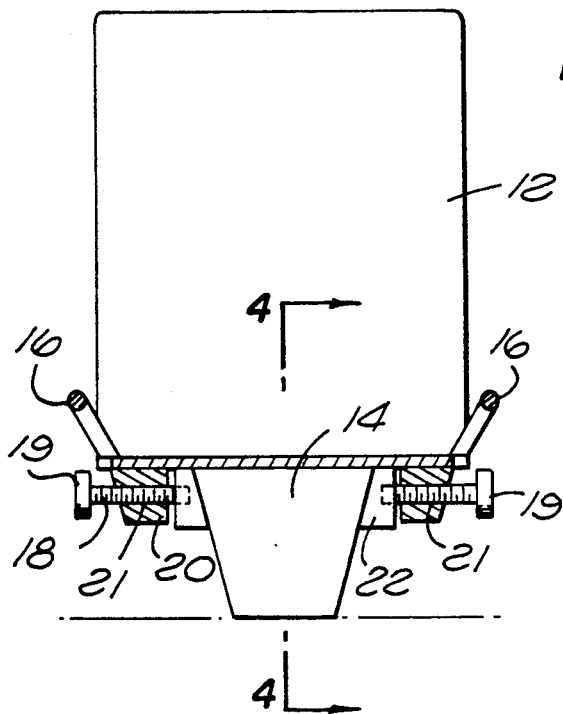
FIG. 3 is a front cutaway view of the seat of the present invention taken along the lines 3—3 showing the preferred method of mounting the ice block to the seat.

Located on the underside of the support member 12 is a means for mounting the ice block 14 on the support member 12. In the preferred embodiment, a clamping mechanism is employed. This mechanism will be described with reference to FIGS. 3 and 5. In the preferred embodiment, a pair of support blocks 20 are located on the underside of the support member 12 adjacent to its edges. The support blocks 20 are made of any suitable material which can be rigidly affixed to the support member 12. Alternatively, they may be formed integrally with the support member. The support blocks 20 extend substantially parallel to the side edges of the support member 12 and a have a length approximately equal to the sides of the ice block 14. The support blocks 20 have a threaded hole 21 as shown in FIG. 3 into which a locking screw 18 is placed. The locking screw has a knob 19 located outside of the support blocks which is easily accessibly by the rider. Located adjacent to the support blocks and connected to the locking screw 18 are adjustable compression blocks 22. The locking screw 18, support block 20, and compression block 22 are connected in such a manner that when a rider rotates the knob 19 in one direction the compression block will move towards the center of the support member 12. When the rider turns the knob 19 in the opposite direction, the compression block will move outward.

Figure 4:
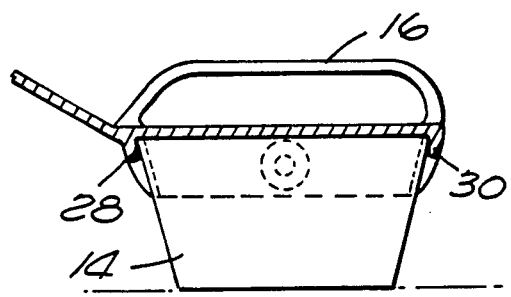
FIG. 4 is a cutaway view of the seat used in the present invention.
Figure 5:
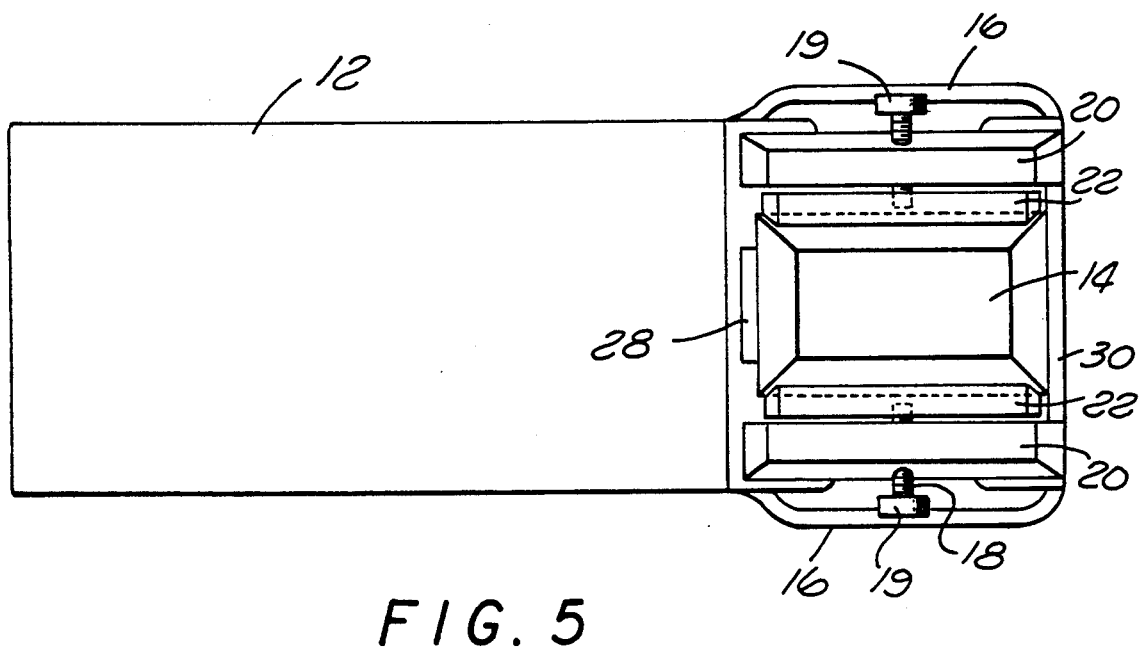
FIG. 5 is a bottom view of the seat of the present invention showing the mechanism for mouting the ice block to the seat.

The ice block is mounted onto the support member 12 by placing it on the bottom side of the support member between the compression blocks 22. Then, the rider turns the knobs 19 so as to firmly hold the ice block in place. As best seen in FIGS. 4 and 5, the support member 12 further includes a rear stop 28 and a front stop 30 on its bottom side. These stops prevent the ice block from moving forwards and backwards relative to the support member. As with the support blocks 20, the front and rear stops may be separately constructed and joined to the support member or they may be formed integrally with the support member.

Figure 6:
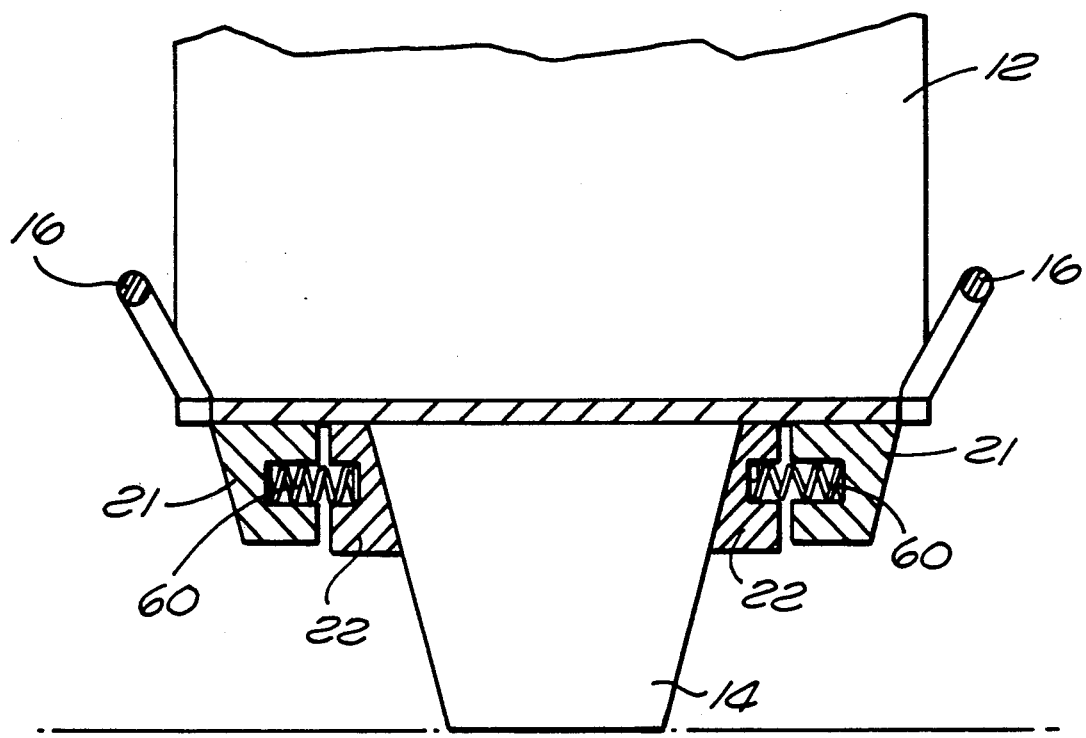
FIG. 6 is a cross-sectional view of the seat member showing an alternative mounting scheme for the Ice Block.
Figure 7:
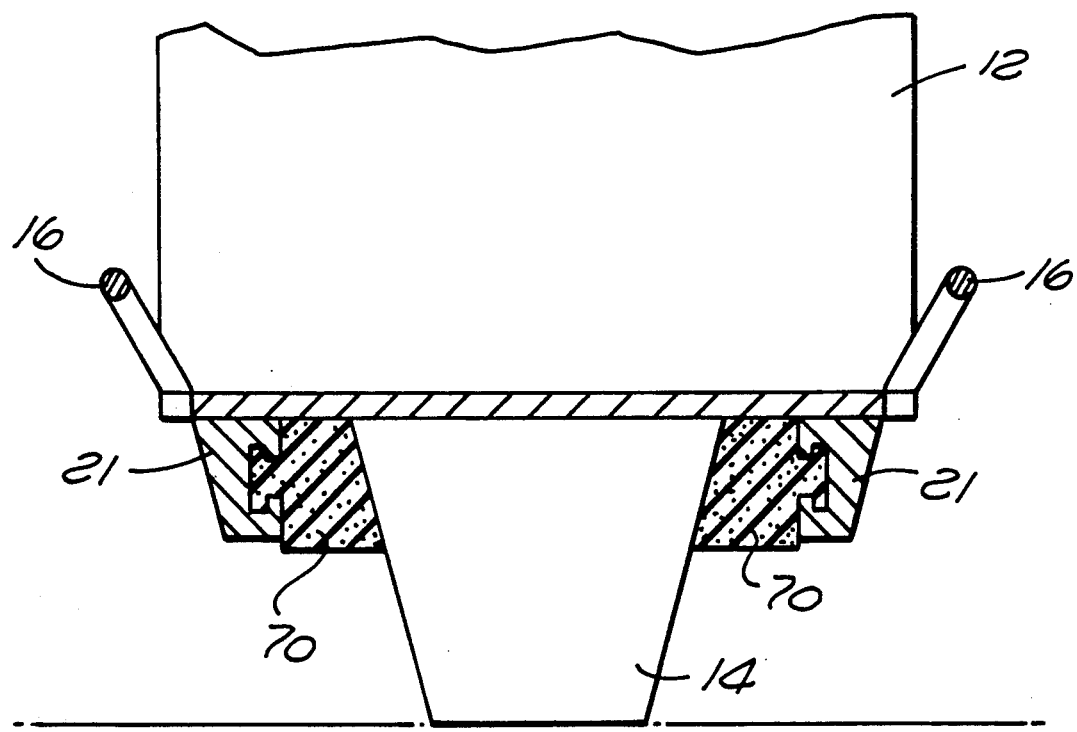
FIG. 7 is a cross-sectional view of the sled showing a second alternative embodiment of the mounting method.

It will be apparent to those skilled in the art that many different means for mounting the ice block onto the support member 12 can be used without departing from the scope of the present invention. The preferred embodiment has been chosen as it allows the rider to continually adjust the clamping force applied to the ice block 14. This adjustment is preferable because as the sled is used the ice block 14 will melt and become smaller. However, other methods may be used to achieve a similar result. For example, as shown in FIG. 6 the compression blocks may be spring loaded by springs 60 and automatically move inward as the size of the ice block decreases. Alternatively, as shown in FIG. 7 the locking screw and adjustable compression blocks can be replaced with a piece of flexible rubber 70. If this method is used, the ice block will simply be wedged into place between the pieces of compressible rubber 70 and held in place by means of a force fit. As the ice melts and becomes smaller, the pieces of rubber 70 will expand, keeping the ice block in place.

It will be appreciated that the ice block 14 which is used in the present invention is not necessarily restricted to any particular size or shape. The only limitation is that the ice block should be large enough to have a surface which provides a relatively friction-free interface with the sledding area. Because of the adjustable nature of the clamping means used in the preferred embodiment, a wide-range of shapes and sizes of blocks can be easily accommodated and used with the sled.

In order to provide an ice block 14 of optimum shape and size which is readily accessible to a rider, the present invention contemplates a mold (not shown) which will easily fit in common household freezer. By using the mold, a rider will have pre-made ice blocks which are of optimum size to be used with the sled.

In the foregoing specification, the invention has been described with reference to several specific exemplary embodiments. It will be evident however, that various modifications and changes may be made in these embodiments without departing from the broader spirit and scope of the invention. The specification and drawings are, accordingly, to be regarded in an illustrative sense and are limited only by the appended claims.

We claim:

1. A sled, comprising:
   a support member having a seat member adapted to accommodate a rider, said support member having a top side and a bottom side and two lateral side edges;
   an adjustable retention means for removably holding a block of ice on said support member, said retention means being connected to said bottom side of said support member, said adjustable retention means comprising:
   first and second support blocks, each of said support blocks being fixed to said bottom side of said seat member adjacent to said first and second side edges thereof, respectively;
   first and second springs, each of said springs having first and second ends, said first end of said first spring being coupled to said first support block and said first end of said second spring being coupled to said second support block such that said second ends of said first and second springs point inwardly toward a center line of said support member;
   a first compression block coupled to said second end of said first spring and a second compression block coupled to said second end of said first spring such that said springs force said compression blocks inward to grip and hold said ice block.

* * * * *